United States Patent
Smith (10) Patent No.: US 8,027,045 B2
(45) Date of Patent: Sep. 27, 2011

(54) SYSTEM AND METHOD FOR MITIGATING PRINTER CLUTCHING

(75) Inventor: Mark A. Smith, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1331 days.

(21) Appl. No.: 11/566,403

(22) Filed: Dec. 4, 2006

(65) Prior Publication Data
US 2008/0130035 A1 Jun. 5, 2008

(51) Int. Cl.
*G06K 15/00* (2006.01)
*G06K 15/02* (2006.01)

(52) U.S. Cl. .................................. 358/1.14; 358/1.1

(58) Field of Classification Search .............. 358/1.14, 358/1.1, 1.15
See application file for complete search history.

(56) References Cited

U.S. PATENT DOCUMENTS

| | | | | |
|---|---|---|---|---|
| 5,077,680 A | * | 12/1991 | Sturm et al. | 358/1.5 |
| 5,781,707 A | * | 7/1998 | Kunz et al. | 358/1.5 |
| 2003/0133141 A1 | * | 7/2003 | Toda et al. | 358/1.13 |
| 2004/0145586 A1 | * | 7/2004 | Jacobsen | 345/441 |
| 2006/0039015 A1 | * | 2/2006 | Kageyama et al. | 358/1.5 |

* cited by examiner

*Primary Examiner* — Benny Tieu
*Assistant Examiner* — Eric A Rust
(74) *Attorney, Agent, or Firm* — Fay Sharpe LLP (57) ABSTRACT

Systems and methods are presented for assessing whether a print job is likely to result in print system clutching by actual or modeled processing of a portion of the print job according to assessed processing rate information and to the print rate of a print engine, and selectively refraining from printing the job based on the comparison of the processing rate information and the print rate.

18 Claims, 4 Drawing Sheets

SYSTEM AND METHOD FOR MITIGATING PRINTER CLUTCHING

BACKGROUND

Commercial printing systems generally include a digital front end (DFE) that processes incoming print jobs in the form of page description language (PDL) files to create the print-ready images, as well as a print engine that receives the images and prints the images onto paper or other printable media. Clutching can occur when print-ready images are not generated as fast as a print engine prints the images. In certain types of printing systems, such as web-fed printing systems in which a continuous spool of printable paper is fed into the print engine, clutching is undesirable, particularly for variable data or indefinite length transactional jobs, wherein unfused images can be placed on the paper web and recovery of a job may involve complicated steps of cutting out the defective printed area from the paper web. Clutching can be partially mitigated by buffering a fixed number of print-ready images prior to starting the print engine. However, this approach does not avoid clutching for indefinite length jobs, since the buffer can exhaust if the DFE processes the remaining images at a slower rate than the print rate. Alternatively, the entire incoming PDL job file can be processed and buffered prior to providing any images to the print engine, but this would require huge amounts of buffer memory for indefinite length jobs, such as printing hundreds of thousands of credit card statements, phone bills, etc. This approach also suffers from an indefinitely long time between provision of the PDL print job to the DFE and the time when the first image is actually printed. Thus, there remains a need for improved printing systems and methods by which the adverse effects of printing system clutching can be avoided or mitigated.

BRIEF DESCRIPTION

Methods and systems are provided for printing incoming print jobs in which the printing system or an external assessment system processes a portion of an incoming print job to determine corresponding processing rate information, and then provides an assessment of whether or not printing the job is likely to result in clutching based on the processing rate information and a print rate associated with the print engine. This pre-printing assessment can be used to selectively inhibit printing of a job for which the front end processing system cannot keep up with the printer speed, or may be provided while the job is in a print queue to alert a print manager to jobs that may be subject to printer clutching if not optimized or modified. The processing can be comprised of any suitable operations involved in creating print-ready images from an incoming print job, including without limitation raster image processing (RIPping), imposition, annotation, print marks, and compression, and may involve actual processing or modeled processing to ascertain a processing rate. In this manner, the present disclosure can generate an automatic print/no print decision for incoming jobs based on the assessed processing rate of a specified number of job pages and/or on processing rate statistics derived from the partial processing, and the printing system can be configured to cycle up the print engine and print the job if the assessment indicates that the job can be processed fast enough to keep up with the printer rate, and to otherwise refrain from printing the job and to construct a fault message including the assessed processing rate information and the printer rate, thereby informing the user how much the job needs to be improved before it may be printed without clutching. In addition, where actual processing is employed that generates a partial set of print-ready images, these may, but need not, be provided to the print engine if the assessment decision is to print the job.

One or more aspects of the present disclosure relate to a printing system comprised of a print engine and a processing system that processes incoming print jobs to create print-ready images for the print engine. An assessment system is provided that causes a portion of an incoming print job to be processed to determine corresponding processing rate information, such as a processing rate, processing statistics, probability values, etc., and which may optionally create a partial set of print-ready images. The processing may be performed using actual print system processing systems, or may be performed in off-line systems or using hardware or software models of the print system processing apparatus. The processing rate information may include a processing rate that is compared to a print engine print rate to provide an assessment of whether the incoming print job can be printed without clutching. One of the processing and print rates can be scaled by a non-unity scaling factor in certain embodiments to ensure the veracity of the comparison in assessing the likelihood of clutching. In various implementations, the selected portion of the job is processed in segments, for instance, page-by-page, and the processing rate information includes statistics, such as mean page rate, page rate distribution, etc. The assessment system in this case may determine an assessed probability of the incoming job printing without clutching based on the statistics, and compare the probability to a print probability threshold.

In certain embodiments, the assessment system selectively inhibits provision of print-ready images to the print engine for the incoming print job if the processing assessed processing rate information indicates that clutching is likely, and otherwise causes a complete set of print-ready images to be created and provided to the print engine for the incoming print job. In this case, any print-ready images created during the assessment may optionally be provided to the print engine, or the entire job can be processed and printed normally. The amount of the incoming print job that is processed and the print probability threshold may be adjustable, and the assessment system can be integrated into the system DFE or may be a separate system to assess incoming print jobs without disrupting an on-line printing system.

Other aspects of the present disclosure provide a method for determining whether a print job can be printed without clutching in a printing system. The method includes receiving a print job, performing actual or modeled processing on a portion of the print job, and determining processing rate information associated with the processing. The method further comprises providing an assessment of the likelihood of the job printing without clutching based on the processing rate information. In one implementation, a processing rate is determined and compared to a print rate associated with a print engine of the printing system. In other implementations, the processing rate information includes segmented processing rates and statistics are computed to determine an assessed probability of the job printing without clutching which can be compared with a print probability threshold.

Further aspects of the disclosure provide a system for mitigating clutching in a printing system. The system comprises a processing system that operates to process print jobs to create print-ready images, and an assessment system operatively coupled with the processing system. The assessment system is operative to cause a portion of a print job to be processed, to determine corresponding processing rate information, and to assess whether the job is likely to print without clutching based on the rate information and a print rate associated with a print engine of the printing system.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
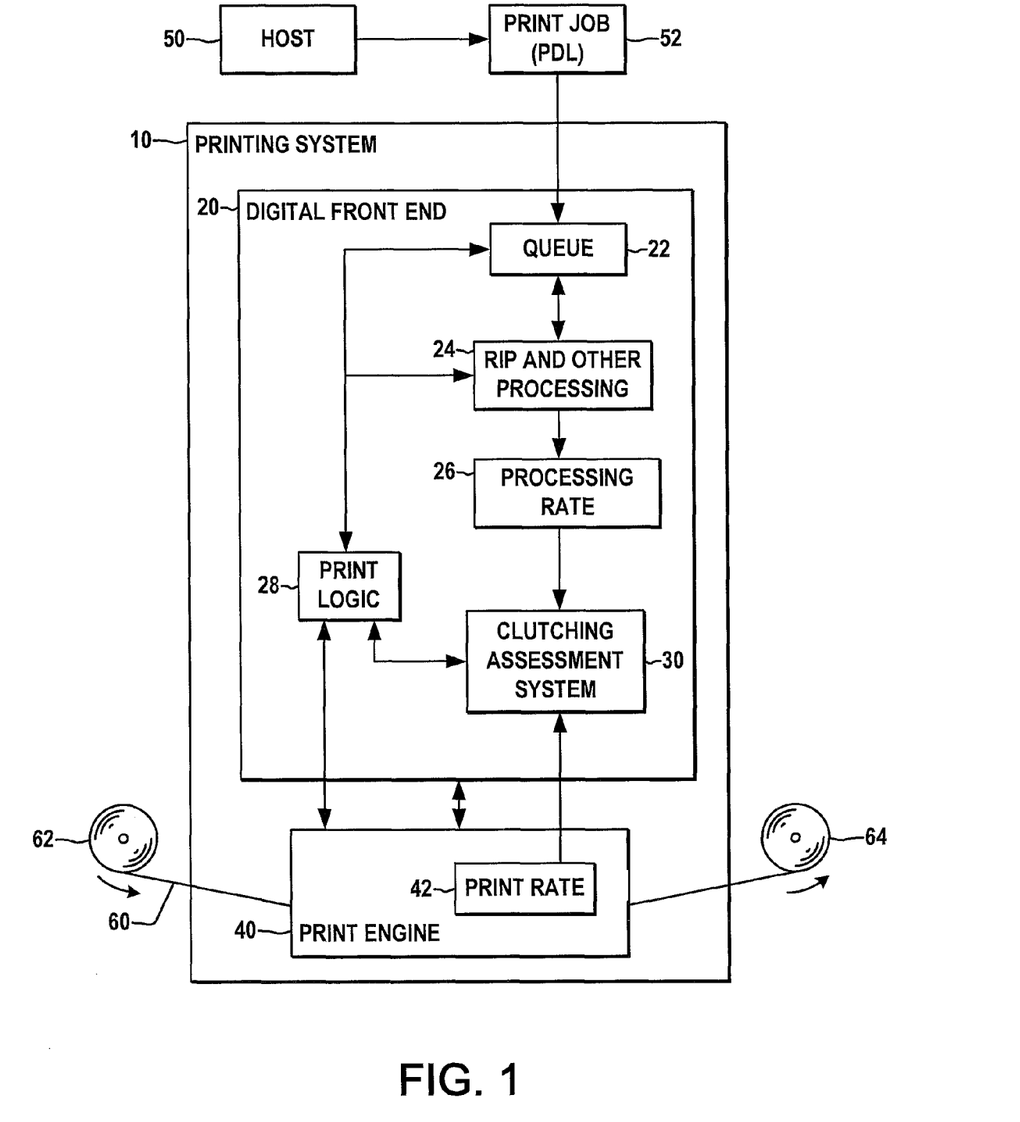
FIG. 1 is a system diagram illustrating an exemplary printing system with a digital front end, a print engine, and a system for assessing whether an incoming job will cause clutching by processing a portion of the incoming job according to the present disclosure.

Referring now to the drawings, FIG. 1 illustrates a printing system 10 in accordance with one or more aspects of the present disclosure, comprising a digital front end (DFE) 20 with a clutching assessment system 30, and a print engine 40 that prints images on a printable media, such as a continuous paper web 60 introduced into the print engine 40 from an input reel or spool 62 and received from the print engine 40 using a take up reel or winder 64. While the embodiment of FIG. 1 includes a web-fed print engine 40, other implementations are possible using any form of print engine 40, including without limitation, sheet-feed printers 40, etc. The DFE 20 can be any suitable hardware, software, or combinations thereof, whether a unitary system or a plurality of systems implementing the front end functionality in distributed form to provide an interface between submitting hosts 50 providing incoming print jobs 52 and the print engine 40. The printing system 10 can be any form of commercial printing apparatus, copier, printer, facsimile machine, or other system having one or more print engines 40 by which visual images, graphics, text, etc. are printed on a page or other printable medium 60, including xerographic, electro photographic, and other types of printing technology, wherein such components are not specifically illustrated to avoid obscuring the various clutching assessment features of the present disclosure.

In the illustrated implementation of FIG. 1, the DFE 20 includes a queue 22 including various hardware memory, disk drives, or other storage apparatus by which one or more incoming print jobs 52 can be received from a computer or other host 50 and stored, in whole or in part, for processing by a processing component or system 24. The processing system 24 operates in concert with the queue 22 in order to process incoming print jobs 52 to thereby create print-ready images suitable for submission to the print engine 40, where the processed images may be stored temporarily in the queue 22 and/or in other memory associated with the printing system 10. In one possible implementation, separate input and output queues 22 are provided, with incoming print job files being stored in an input queue 22 and print-ready images being stored in the output queue. The DFE 20 further comprises print logic 28 that may be any hardware, software, or combinations thereof to control operation of the processing system 24, the queue 22, and other components of the printing system 10 by which incoming print jobs 52 comprising print description language (PDL) files or other forms of print jobs can be formatted and processed to provide one or more corresponding print-ready images to the print engine 40.

The exemplary clutching assessment system 30 may include any suitable hardware, software, or combinations thereof which are configured, programmed, or otherwise adapted to implement the assessment and control functions set forth herein, wherein the assessment system 30 in the illustrated printing system 10 of FIG. 1 is integrated into the DFE 20. Alternative embodiments are possible in which the assessment system 30 is separate from the DFE 20, for example, as illustrated and described below with respect to FIG. 4. The assessment system 30 is operatively coupled with the processing system 24 directly or via the print logic 28 to cause a portion of an incoming print job 52 to be processed in accordance with the present disclosure to determine corresponding processing rate information such as a processing rate, segment processing rates for a plurality of processed segments and corresponding processing rate statistics, assessed probability values, etc., and optionally to create a partial set of print-ready images, which may be stored in the queue 22 or elsewhere in the system 10. The partial processing comprises any actual or modeled operations associated with generating one or more print-ready images corresponding to processed portion of the incoming print job 52 by the processing system 24, and in one possible implementation includes without limitation one or more of raster image processing (RIPping), imposition, annotation, print marks, and compression. The partial processing can be done over any predefined or adjustable portion of an incoming print job 52, such as a default number of pages in one example, where the amount to be processed may be adjustable by a user or by the assessment system 30, and the processed portion amount may be specified by the sending host 50 or an operator for a given job 52 as a parameter associated with a given print job 52. Moreover, the selected portion may be processed in segments, such as pages, to derive segment processing rate values from which statistics and probability values can be derived.

The partial processing in one embodiment, whether actual or modeled, yields a processing rate 26 corresponding to the time taken by the processing system 24 to generate the corresponding print-ready image(s). The assessment system 30 in this implementation compares the processing rate 26 to a print rate 42 associated with the print engine 40, and based on this comparison, provides an assessment of whether the incoming print job 52 can be printed without clutching of the print engine 40. Various actions can be performed automatically by the clutching assessment system 30 depending on the assessment rate comparison. In one possible implementation, the system 30 takes one of two actions based on the rate comparison, including preventing or inhibiting provision of print-ready images to the print engine 40 for the incoming print job 52 if the processing rate 46 is less than or equal to the print rate 42, and otherwise causing creation of a complete set of print-ready images for the incoming print job 52 and provision of the print-ready images to the print engine 40 if the processing rate 26 is greater than the print rate 42.

In certain possible embodiments, moreover, a margin of error can be provided in the comparison, such as multiplying one of the rates by a constant prior to the comparison, with the decision to selectively inhibit provision of print-ready images to the print engine 40 being in some manner based on the comparison of the processing rate to the print rate, wherein the constant may be unity or otherwise. Furthermore, the assessment system may perform various conversion computations to compare the processing and print rates 26, 42, for instance, where the print rate 42 may be in feet/minute, sheets/minute or other units, and the processing rate 26 may be converted from images/minute or other unit of measure to corresponding units for the comparison. In addition, the operation of the processing system 30 may be configurable or adjustable, for instance, allowing the multiplication constant (and hence the margin of error) to be set by a host 50 or operator, along with allowing the amount of the processed portion of the incoming print job 52 to be adjustable.

In this manner, the above described embodiment of the assessment system 30 provides an indication of whether or not print engine clutching is to be expected prior to the start of printing, and without occupying significant system resources, where the assessment can be used in a variety of ways, with or without operator intervention. In this respect, if the assessment system 30 determines that the processing rate 26 is not high enough to keep up with the printing rate 42, the job 52 can be assessed by the system 30 as likely to result in clutching of the print engine 40, in which case the job 52 can be automatically faulted, with an optional fault message or other notification being generated by the assessment system 30 to indicate to the print manager or operator that the job 52 as submitted would result in clutching. Such a message can optionally include various data or information related to the partial processing, for instance, such as the processing rate 26, the print rate 42, and contents of typical processed pages. In this manner, the host 50 or the originator of the incoming job 52 can be apprised of the assessed susceptibility of the job 52 to clutching and may use the provided information to modify the job for resubmission in order to attempt to avoid clutching.

The assessment features of the present disclosure may find particular utility in association with long or indefinite length transactional or variable data print jobs 52 having highly repetitive content, print environments with constrained print windows or those in which a submitter has the ability to tune the job or the job creation application to improve job performance, wherein early assessment of the clutching vulnerability can mitigate or eliminate the need for creating and running dummy pilot jobs. In this respect, the disclosure utilizes the repetitive nature of variable data and/or indefinite length jobs in order to provide the assessment assuming that once the processing rate 26 has been determined by processing a limited number of pages or images of the incoming job 52, the determined processing rate 26 is likely to be a good estimate for processing the remainder of the job 52. In addition, the allowance of a non-unity scaling factor can enhance the veracity of the assessment by introducing an adjustable margin of error to accommodate certain known or suspected non-uniformities in lengthy print jobs.

Figure 2:
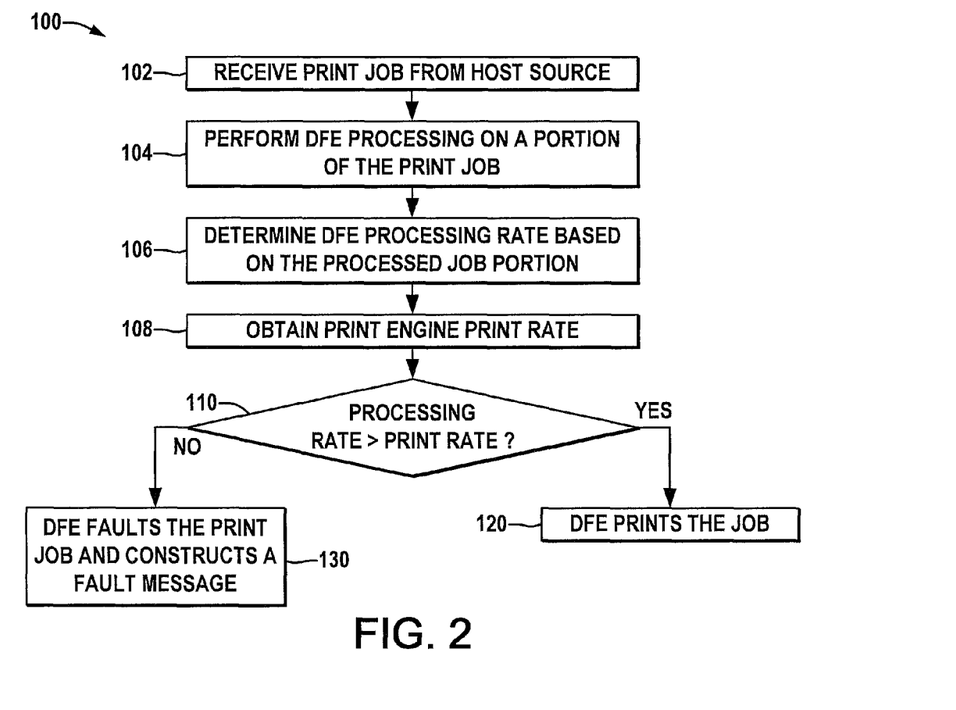
FIG. 2 is a flow diagram illustrating an exemplary method of determining whether a print job can be printed without clutching in a printing system.
Figure 3:
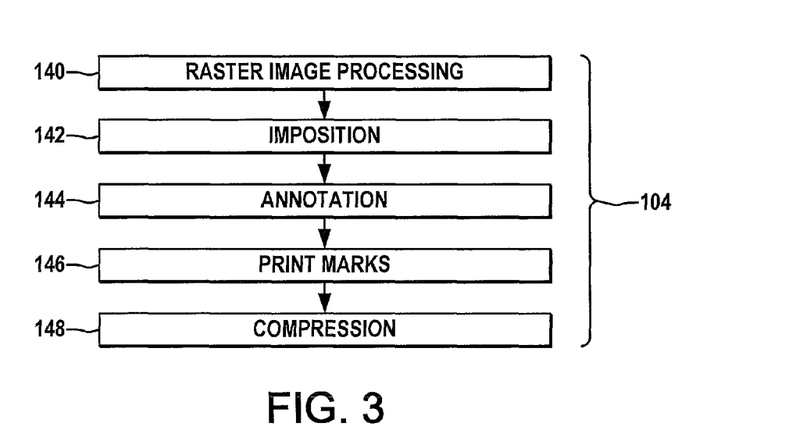
FIG. 3 is a flow diagram illustrating exemplary partial processing to derive a processing rate in the methods and systems of the disclosure.

Referring also to FIGS. 2 and 3, a method 100 is illustrated in FIG. 2 for determining whether a print job can be printed without clutching in a printing system. Although the exemplary method 100 is illustrated and described below in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 100 and other methods of the disclosure may be implemented in hardware, software, or combinations thereof, in order to provide assessment of the relative processing and printing rates for a given print job in any form of printing system such as those illustrated and described above, wherein the disclosure is not limited to the specific applications and implementations illustrated and described herein.

A print job is received at 102 in the method 100 of FIG. 2, such as from a host computer or other source of incoming print jobs, wherein the received print job may be of any suitable form from which a set of print-ready images may be created. The print job received at 102 can include, for instance, a page description language (PDL) file, as well as an optional job ticket with attributes to be applied to the job when printed, including for example a designation of a number of pages or images to be processed to assess the likelihood of clutching. At 104, a portion of the print job is processed, for instance, including various processing steps usually undertaken to generate a print-ready image from the incoming PDL job. The processing at 104 can be actual processing using processing systems or components of an actual on-line printing system or off-line processing system, or all or a portion of the processing may be modeled in software or hardware or combinations thereof, in order to assess the processing time required for the assessed portion of the incoming print job and a corresponding processing rate.

FIG. 3 illustrates one example of possible processing steps that may be performed at 104 in the method 100 of FIG. 2, any or all of which can be performed by actual processing to generate a partial set of print-ready images, or which can be modeled in hardware, software, or combinations thereof. In this respect, off-line processing systems may be employed for the assessment processing at 104, such as illustrated and described below with respect to FIG. 4, using different processing hardware, software, and/or combinations thereof, that may be configured differently than the actual processing system 24 of the target print system 10, in which case the assessed processing rate may be adjusted to compensate for any such differences. Alternatively, the assessment processing may be performed using software models or simulation systems, which may be employed on-line within the target printing system 10 or off-line in a separate assessment system. The actual or simulated operations may include, without limitation, raster image processing at 140, imposition at 142, annotation at 144, provision of print marks at 146, and data compression at 148, in order to create or generate a bitmap or other print-ready image, such as a file, that can be printed by the print engine. The RIP processing at 140 generally involves operations using the PDL instructions of the received print job to generate pixels or bits (bitmap) that can be understood by the print engine. The imposition at 142 optionally renders two or more images or pages on a single printed sheet, where a "sheet" can be a given length of a continuous web media 60 in web-fed type print systems, and examples include rendering two pages in a "two-up" imposition, four pages in a "four-up" imposition, etc. Annotations, such as watermarks, page numbers, chapter numbers, headers, and/or footers, etc. may be added at 144, and print marks may be optionally added at 146, such as markings indicating a target page size or sheet boundaries used in subsequent cutting or finishing operations. Once a raw bitmap is constructed, data compression can be undertaken at 148 to reduce the amount of data in the print-ready image.

At 106 in FIG. 2, a processing rate is determined based on the amount of actual or modeled time that elapsed during the processing at 104 and on the amount of the print job that was processed, and a print engine print rate is obtained at 108. A determination is made at 110 as to whether the determined processing rate exceeds the print rate. If so (YES at 110), the job is printed at 120, for instance, including completion of the necessary processing and provision of print-ready images to the print engine. Otherwise (NO at 110), the job is faulted and a fault message is constructed at 130.

It is noted in the above described embodiments that the processing assessment features may be performed automatically for all incoming print jobs 52, or that an operator or host computer 50 may selectively place the printing system 10 in an automatic assessment mode, for instance, as a site setting for the system 10, or as a queue setting, such as where jobs 52 sent to a first queue are automatically assessed while print jobs 52 sent to a different (second) queue are not assessed. Alternatively, the assessment may be requested on a job-by-job basis, for instance, using a parameter or attribute provided with a job ticket accompanying a given print job 52. Moreover, the amount of the assessed job portion may be preset or may be adjusted as a site setting, a queue setting, or on a job-by-job basis.

In other possible embodiments, the system 10 may be configurable to allow an operator to select a job 52 from a queue 22 of pending print jobs 52 and to initiate an automatic assessment "on demand" as a preprinting test, with the assessment being provided to the operator, for instance, via a user interface, messaging, a state set on the job indicating whether the job has passed or failed the assessment, etc., wherein the job 52 may, but need not, be scheduled for printing at the time it is placed in the queue 22. In this manner, the operator can be informed ahead of time whether clutching problems are likely or expected for a given print job 52. Moreover, in other embodiments where the assessment is a queue setting, an operator can set an assessment attribute associated with a specific queue 22 by which clutching assessment is performed for each job received into the queue 22, where the assessment result can be indicated via a user interface, messaging, a state set on the job indicating whether the job has passed or failed the assessment, etc., and wherein the job may, but need not, be scheduled for printing at the time it is placed in the queue 22.

Figure 4:
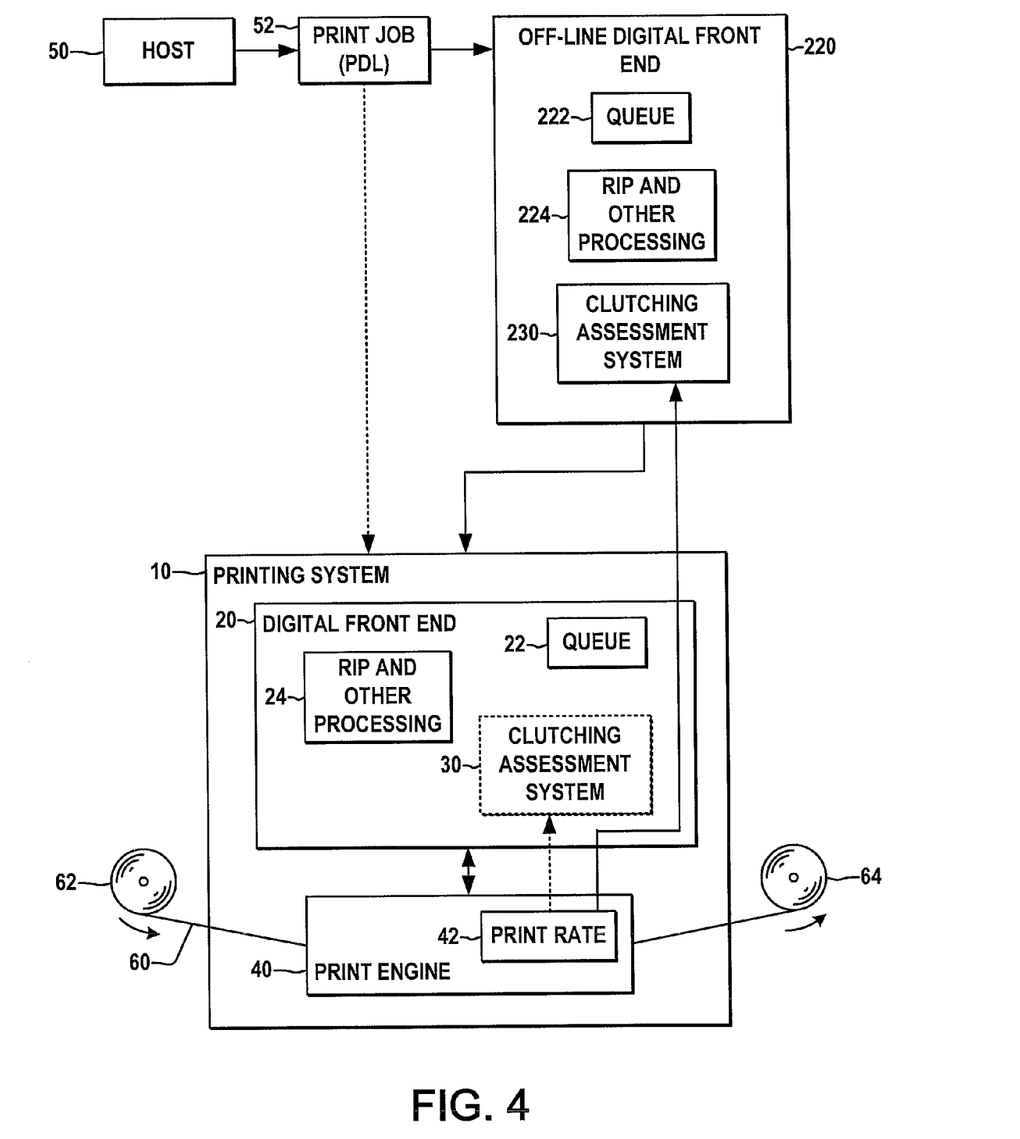
FIG. 4 is a system diagram illustrating another exemplary printing system and an external clutching assessment system.

Referring also to FIG. 4, in another possible implementation, the performance assessment system may be separate from the DFE 20. FIG. 4 illustrates the printing system 10 with a DFE 20 and a print engine 40 as generally described above, as well as an external or separate off-line type DFE 220 that is operatively coupled with the printing system 10 and able to receive an incoming print job 52 for pre-printing clutching assessment. In this respect, the job 52 may be provided to the separate DFE 220 directly by the host system 50 or indirectly by way of the printing system 10, where the off-line DFE 220 includes a queue 222 for storing received print jobs 52 and for buffering any partial set of print-ready images generated by the assessment processing. In addition, the off-line DFE 220 includes a processing system 224 which in one embodiment can be similar in construction and functionality to the above described processing system 24 of the printing system 10 or which may be a model of the on-line processing system 24, or an actual processing system that can be different from the on-line processing system 24 in other embodiments. The off-line DFE 220 further includes a clutching assessment system 230 having the features and capabilities of the on-board assessment system 30 in the printing system 10 of FIG. 1 above. In this respect, the off-line processing system or model 224 may also provide for non-unity scaling of the print rate 42 or the processing rate 26 in order to account for any differences between the actual print system processing system 24 and the off-line processing, whether actual or modeled processing. The disclosure thus allows the assessment to be undertaken without disrupting the productivity of the on-line DFE 20 of the printing system 10, wherein the "off-line" DFE 220 may, but need not, have an associated print engine. Once the performance assessment has been performed on the off-line DFE 220, the assessment determination or results are forwarded to the printing system 20, which then selectively prints the job or not depending on the assessment results. In another possible implementation, the print-ready images associated with the partially processed job 52 can be forwarded to the on-line DFE 220 for storage in the queue 22 thereof if a determination has been made that the job 52 will print without clutching, where the printing system 10 can use these previously processed images when the job prints. Alternatively, an operator can review assessed jobs at the off-line DFE 220 and selectively forward certain of them as desired to the on-line DFE 20 according to the corresponding assessment results.

Figure 5:
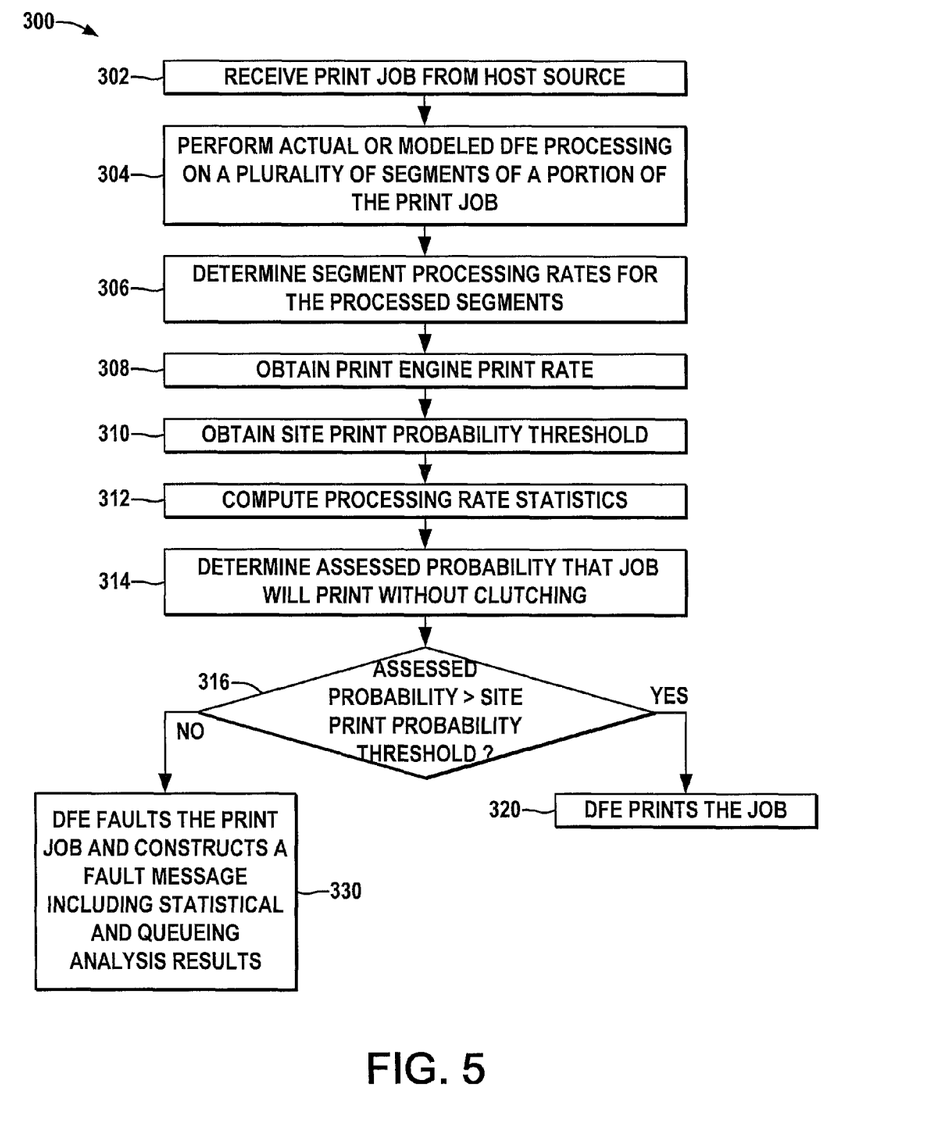
FIG. 5 is a flow diagram illustrating an exemplary method of determining whether a print job is likely to print without clutching in a printing system in accordance with the present disclosure.

Referring now to FIG. 5, the assessment may alternatively or in combination include statistical computations and analysis to provide an assessed probability of the likelihood that an incoming print job 52 can successfully print without clutching, where the assessed probability can be compared to a predetermined or adjustable print probability threshold. In such implementations, a processing rate 26 may be determined independently for each page or other predefined segment that is partially processed over the predefined or adjustable portion of the incoming print job 52. The segment processing rates can then be used to compute processing rate statistics such as a mean page rate, a page rate distribution, or other statistical values, and queuing analysis is performed by the assessment system 30 to determine an assessed probability that the incoming print job 52 will print to the print engine 40 without clutching. In one embodiment, this queuing analysis can be based on the print rate 42, which may include a plurality of page or segment print rates corresponding to the processed segments, as well as on the size of the queue of print-ready images. The assessment system 30 further may compare the probability that the job will print with a probability threshold for printing that can be provided as part of a site setting for the system 10. In this case, where the assessed probability exceeds the site setting probability threshold, the print logic 28 or the assessment system 30 will cause the job to complete processing and print ready images are sent to the print engine 40. Otherwise, the incoming print job 52 can be faulted, and a fault message is constructed for provision to the system operator via a user interface, or to be set on the job, which may include the statistical analysis and queuing analysis results.

An exemplary method 300 is depicted in FIG. 5 for determining whether a print job is likely to print without clutching in a printing system, which begins at 302 with receipt of an incoming print job. Actual or modeled processing is performed at 304 for a portion of the incoming job, where the processing is done in segments, such as page-by-page, and segment processing rates are determined at 306. At 308, a print engine print rate is obtained, and a site print probability threshold is obtained at 310, for instance, from an operator or from a pre-provisioned site setting stored in the printing system 10. Processing rate statistics are computed at 312, such as mean page processing rate, standard deviations, median values, etc., using any suitable statistical processing techniques, and an assessed probability is determined at 314 based on the computed statistics and the print engine print rate. This assessment is indicative of the likelihood that the incoming job will print without print engine clutching, and is compared at 316 with the threshold. If the assessed probability exceeds the threshold (YES at 316), the job is printed at 320. Where the threshold is greater than or equal to the assessed probability (NO at 316), the job is faulted at 330 and the DFE can optionally construct and provides a fault message to an operator which may include the statistics, the queuing analysis results, the size of the processed portion, the number of processed pages, the probability threshold, etc.

The statistical analysis of individual page rates within the job may advantageously assist the job creator, either as feedback for a submitted job, and/or as an output of a DFE assessment tool (e.g., where the job is not automatically sent to a print engine 40, but is instead only analyzed for clutching susceptibility. The statistical results in either case would inform the job creator as to whether the job is likely to clutch or not, what the mean page rate was, what the page rate distribution was, etc. With this information, the creator may perform certain modifications in the job construction to attempt to reduce the mean page rate, or tighten the distribution to decrease the probability of clutching, or other suitable adjustments. Moreover, such statistics could be employed at the local system 10 in conjunction with a site policy setting to set the print probability threshold for deciding whether to print all incoming jobs, or such a service could be provided for certain input queues 22 (e.g., as part of a queue setting) or on a job setting for individual print jobs 52. In one example of a site setting, an owner or operator of a given digital printing system 10 could establish the probability threshold, for instance at 97% for selectively printing or faulting incoming jobs 52, so as to mitigate the chance of print engine clutching.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A printing system, comprising:
   a print engine operative to print images on a printable media;
   a processing system operative to process incoming print jobs to create print-ready images for the print engine; and
   an assessment system operatively coupled with the processing system, the assessment system operative to cause actual or modeled processing of a portion of an incoming print job to determine corresponding processing rate information, to provide an assessment, prior to providing any print-ready images to the print engine for the incoming print job, of whether the incoming print job is likely to be printed without clutching based on the processing rate information and a print rate associated with the print engine, and if the assessment indicates that the incoming print lob is unlikely to be printed without clutching, to fault the incoming print lob and inhibit provision of print-ready images to the print engine for the incoming print job,
   wherein the assessment system causes actual or modeled processing of a plurality of segments of the portion of the incoming print job, wherein the processing rate information comprises processing rate statistics, and wherein the assessment system determines an assessed probability of the incoming print job printing without clutching based on the processing rate statistics,
   wherein the assessment system selectively inhibits provision of print-ready images to the print engine for the incoming print job if the assessed probability is less than or equal to a print probability threshold, and
   wherein the assessment system causes creation of a complete set of print-ready images for the incoming print job and provision of the print-ready images to the print engine if the assessed probability is greater than the print probability threshold.

2. The printing system of claim 1, wherein the processing rate information comprises a processing rate and wherein the assessment system compares the processing rate with the print rate and selectively inhibits provision of print-ready images to the print engine for the incoming print job if the processing rate is less than or equal to the print rate.

3. The printing system of claim 2, wherein the assessment system causes creation of a complete set of print-ready images for the incoming print job and provision of the print-ready images to the print engine if the processing rate is greater than the print rate.

4. The printing system of claim 3, wherein the assessment system multiplies one of the processing rate and the print rate by a constant value prior to comparing the processing rate with the print rate.

5. The printing system of claim 1, wherein the processing of the portion of the incoming print job comprises at least one of raster image processing, imposition, annotation, print marks, and compression.

6. The printing system of claim 1, wherein the print engine is web-fed.

7. The printing system of claim 1, wherein an amount of the incoming print job portion is adjustable.

8. The printing system of claim 1, wherein the assessment system is integrated into a digital front end of the printing system.

9. The printing system of claim 1, wherein the assessment system is separate from a digital front end of the printing system.

10. The printing system of claim 1, wherein the print engine is a xerographic print engine.

11. A method for determining whether a print job can be printed without clutching in a printing system, the method comprising in optional sequence:

receiving a print job; performing actual or modeled processing of a portion of the print job;
determining processing rate information associated with the actual or modeled processing of the portion of the print job;
prior to providing any print-ready images to the print engine for the incoming print job, providing an assessment of whether the print job is likely to be printed without clutching based on the processing rate information; and
if the assessment indicates that the incoming print job is unlikely to be printed without clutching, inhibiting provision of print-ready images to the print engine for the incoming print job;
wherein performing actual or modeled processing of a portion of the print job comprises performing actual or modeled processing of a plurality of segments of the portion of the incoming print job;
wherein determining the processing rate information comprises determining a segment processing rate for each processed segment; and
wherein providing the assessment comprises:
computing processing rate statistics based on the segment processing rates; and
determining an assessed probability of the incoming print job printing without clutching based on the processing rate statistics,
further comprising selectively inhibiting provision of print-ready images to the print engine for the incoming print job if the assessed probability is less than or equal to a print probability threshold, and
further comprising causing creation of a complete set of print-ready images for the incoming print job and provision of the print-ready images to the print engine if the assessed probability is greater than the print probability threshold.

12. The method of claim 11, wherein processing the portion of the print job comprises at least one of raster image processing, imposition, annotation, print marks, and compression.

13. The method of claim 11, wherein the processing rate information comprises a processing rate, further comprising comparing the processing rate to a print rate associated with a print engine of the printing system; and selectively inhibiting provision of print-ready images to the print engine for the print job if the processing rate is less than or equal to the print rate.

14. The method of claim 13, further comprising causing a complete set of print-ready images to be created and provided to the print engine for the print job if the processing rate is greater than the print rate.

15. The method of claim 14, further comprising multiplying one of the processing rate and the print rate by a constant value prior to comparing the processing rate with the print rate.

16. A system for mitigating clutching in a printing system, comprising:
at least one processor;
a processing system, implemented using the at least one processor, operative to process print jobs to create print-ready images; and
an assessment system operatively coupled with the processing system, the assessment system, implemented using the at least one processor, operative to cause actual or modeled processing of a portion of a print job to determine corresponding processing rate information, to provide an assessment, prior to providing any print-ready images to the print engine for the incoming print job, of whether the incoming print job is likely to be printed without clutching based on the processing rate information and a print rate associated with a print engine of the printing system, and if the assessment indicates that the incoming print lob is unlikely to be printed without clutching, to fault the incoming print lob and inhibit provision of print-ready images to the print engine for the incoming print job;
wherein the assessment system causes actual or modeled processing of a plurality of segments of the portion of the incoming print job, wherein the processing rate information comprises processing rate statistics, and wherein the assessment system determines an assessed probability of the incoming print job printing without clutching based on the processing rate statistics,
wherein the assessment system selectively inhibits provision of print-ready images to the print engine for the incoming print job if the assessed probability is less than or equal to a print probability threshold, and
wherein the assessment system causes creation of a complete set of print-ready images for the incoming print job and provision of the print-ready images to the print engine if the assessed probability is greater than the print probability threshold.

17. The system of claim 16, wherein the processing system is operative to perform at least one of raster image processing, imposition, annotation, print marks, and compression.

18. The system of claim 16, wherein the processing system and the assessment system are integrated into the printing system.

* * * * *